US012071874B2

(12) United States Patent
Williams et al.

(10) Patent No.: US 12,071,874 B2
(45) Date of Patent: Aug. 27, 2024

(54) SOUND ATTENUATING ENGINE EXHAUST SYSTEM

(71) Applicant: K&N Engineering, Inc., Riverside, CA (US)

(72) Inventors: Steve E. Williams, Cherry Valley, CA (US); Kevin McClelland, Riverside, CA (US)

(73) Assignee: K&N Engineering, Inc., Riverside, CA (US)

( * ) Notice: Subject to any disclaimer, the term of this patent is extended or adjusted under 35 U.S.C. 154(b) by 310 days.

(21) Appl. No.: 17/156,364

(22) Filed: Jan. 22, 2021

(65) Prior Publication Data

US 2021/0231035 A1 Jul. 29, 2021

Related U.S. Application Data

(60) Provisional application No. 62/965,732, filed on Jan. 24, 2020.

(51) Int. Cl.
*F01N 1/02* (2006.01)
*F01N 1/06* (2006.01)
(Continued)

(52) U.S. Cl.
CPC .............. *F01N 1/023* (2013.01); *F01N 1/06* (2013.01); *G10K 11/161* (2013.01);
(Continued)

(58) Field of Classification Search
CPC . F01N 1/023; F01N 1/06; F01N 13/02; F01N 2490/15; G10K 11/161; G10K 11/172; G10K 11/175
(Continued)

(56) References Cited

U.S. PATENT DOCUMENTS 3,348,629 A * 10/1967 Cassel .................. F01N 13/082 181/247
3,396,812 A * 8/1968 Wilcox .................... F01N 1/06 181/250

(Continued)

FOREIGN PATENT DOCUMENTS

EP 0481450 A1 * 4/1992
JP 2001020717 A * 1/2001

OTHER PUBLICATIONS

English translation of EP-0481450-A1, accessed Jan. 8, 2024 via USPTO Search Tool (Year: 1992).*

(Continued)

*Primary Examiner* — Jeremy A Luks
(74) *Attorney, Agent, or Firm* — Rutan & Tucker LLP; Hani Z. Sayed

(57) ABSTRACT

A sound attenuating engine exhaust system and methods are provided for directing exhaust gases away from an internal combustion engine of a vehicle and attenuating undesirable exhaust sounds during engine operation. The sound attenuating engine exhaust system comprises an exhaust inlet configured to receive exhaust gases from the internal combustion engine. A first resonator coupled with the exhaust inlet is configured to dampen at least one frequency of exhaust sound waves by way of destructive wave interference. The first resonator includes an exhaust outlet for directing the exhaust gases out of the first resonator. A second resonator is coupled with the first resonator and configured to dampen one or more frequencies of exhaust sound waves by way of a combination of destructive wave interference and Helmholtz resonance. Hangers facilitate attaching the sound attenuating engine exhaust system to an undercarriage of the vehicle.

17 Claims, 4 Drawing Sheets

(51) Int. Cl.
*G10K 11/16* (2006.01)
*G10K 11/172* (2006.01)
*G10K 11/175* (2006.01)

(52) U.S. Cl.
CPC .......... *G10K 11/172* (2013.01); *G10K 11/175* (2013.01); *F01N 2490/15* (2013.01)

(58) Field of Classification Search
USPC .......................................................... 181/232
See application file for complete search history.

(56) References Cited

U.S. PATENT DOCUMENTS

| | | | | | |
|---|---|---|---|---|---|
| 3,402,785 | A * | 9/1968 | Heath | F01N 1/006 | 181/250 |
| 4,449,608 | A * | 5/1984 | Hirata | F02B 27/04 | 181/240 |
| 5,493,080 | A * | 2/1996 | Moss | F01N 13/02 | 181/227 |
| 5,952,625 | A * | 9/1999 | Huff | F01N 1/06 | 181/266 |
| 7,240,769 | B2 * | 7/2007 | Nezan | F01N 1/003 | 181/276 |
| 7,600,607 | B2 * | 10/2009 | Sullivan | H01L 35/30 | 181/278 |
| 7,942,239 | B2 * | 5/2011 | Huff | F01N 1/023 | 181/266 |
| 8,919,491 | B2 * | 12/2014 | Trumler | F02M 35/1266 | 181/227 |
| 9,587,535 | B2 * | 3/2017 | Williams | F01N 1/06 | |
| 2005/0235615 | A1 | 10/2005 | Nyman et al. | | |
| 2006/0000667 | A1 | 1/2006 | Osterkamp et al. | | |
| 2008/0023265 | A1 | 1/2008 | Frederiksen et al. | | |
| 2010/0270103 | A1 | 10/2010 | Huff et al. | | |
| 2014/0151148 | A1 | 6/2014 | Pradhan | | |
| 2015/0247433 | A1 * | 9/2015 | Colette | F01N 13/107 | 60/273 |
| 2016/0333756 | A1 | 11/2016 | Horr | | |
| 2018/0016954 | A1 | 1/2018 | Eichmueller et al. | | |
| 2018/0149052 | A1 | 5/2018 | Nousiainen et al. | | |
| 2019/0093528 | A1 * | 3/2019 | Egan | G10K 11/172 | |
| 2019/0128216 | A1 | 5/2019 | Maqbool | | |
| 2020/0018203 | A1 * | 1/2020 | Yoon | F01N 1/089 | |
| 2020/0018204 | A1 * | 1/2020 | Brockway | F01N 1/06 | |

OTHER PUBLICATIONS

English translation of JP-2001020717-A, accessed Jan. 8, 2024 via USPTO Search Tool (Year: 2001).*

PCT Office, PCT International Search Report and Written Opinion, PCT/US2021/014807, dated Apr. 29, 2021.

* cited by examiner

SOUND ATTENUATING ENGINE EXHAUST SYSTEM

PRIORITY

This application claims the benefit of and priority to U.S. Provisional Application, entitled "Sound Attenuating Engine Exhaust System," filed on Jan. 24, 2020 and having application Ser. No. 62/965,732, the entirety of said application being incorporated herein by reference.

FIELD

Embodiments of the present disclosure generally relate to the field of engine exhaust systems. More specifically, embodiments of the disclosure relate to an apparatus and methods for a sound attenuating engine exhaust system for dampening acoustic frequencies within exhaust systems giving rise to undesirable exhaust noise.

BACKGROUND

Exhaust drone may be described as a deep, constant bass-like sound, or a resonating sound that rattles the interior of a vehicle at certain engine speeds. Expressed differently, exhaust drone occurs when the frequency of vibration of an exhaust system matches a natural frequency of vibration of the entire vehicle, resulting in a loud resonating sound that varies with engine speed. In some cases, exhaust drone can be loud enough to stifle conversation, or listening to the radio within the passenger compartment of the vehicle.

Exhaust drone tends to be more prevalent with aftermarket, or performance exhaust systems, particularly those exhaust systems in which the components comprising the system have been welded together. Attempting to eliminate exhaust drone can be time consuming and difficult, and often requires a trial-and-error approach to resolve. What is needed, therefore, is an apparatus and methods for dampening, or attenuating, those certain acoustic frequencies within exhaust systems giving rise to undesirable exhaust noise.

SUMMARY

A sound attenuating engine exhaust system and methods are provided for directing exhaust gases away from an internal combustion engine of a vehicle and attenuating undesirable exhaust sounds during engine operation. The sound attenuating engine exhaust system comprises an exhaust inlet configured to receive exhaust gases from the internal combustion engine. A first resonator coupled with the exhaust inlet is configured to dampen at least one frequency of exhaust sound waves by way of destructive wave interference. The first resonator includes an exhaust outlet for directing the exhaust gases out of the first resonator. A second resonator is coupled with the first resonator and configured to dampen one or more frequencies of exhaust sound waves by way of a combination of destructive wave interference and Helmholtz resonance. Hangers facilitate attaching the sound attenuating engine exhaust system to an undercarriage of the vehicle.

In an exemplary embodiment, a sound attenuating engine exhaust system to convey exhaust gases away from an internal combustion engine of a vehicle comprises: an exhaust inlet configured to receive exhaust gases from the internal combustion engine; a first resonator coupled with the exhaust inlet and configured to dampen at least one frequency of exhaust sound waves; an exhaust outlet for directing the exhaust gases out of the first resonator; a second resonator configured to cooperate with the first resonator to dampen one or more frequencies of exhaust sound waves; and a resonant neck connecting the second resonator with the exhaust outlet and configured to cooperate with the second resonator to dampen the one or more frequencies of exhaust sound waves.

In another exemplary embodiment, the resonant neck comprises a tube-shaped member that is connected to the exhaust outlet at a first end and connected to the second resonator at a second end. In another exemplary embodiment, the resonant neck puts the second resonator into fluid communication with the exhaust system, such that the second resonator cooperates with the first resonator to directly influence the acoustic properties of the exhaust system of the vehicle.

In another exemplary embodiment, the first resonator is configured to attenuate the at least one frequency of exhaust sound waves by way of destructive interference. In another exemplary embodiment, the first resonator is tuned to reflect an incoming sound wave so as to destructively interfere with a following sound wave. In another exemplary embodiment, the first resonator is tuned to a length that causes the incoming sound wave to travel a distance that is substantially the same as one quarter of a wavelength of the incoming sound wave before being reflected. In another exemplary embodiment, the incoming sound wave travels a distance within the first resonator that is substantially equivalent to one half of the wavelength before destructively interfering with the following sound wave, thereby reducing acoustic energy exiting the first resonator.

In another exemplary embodiment, the exhaust inlet is coupled with the exhaust outlet to form an exhaust tube that extends from a first endcap to a second endcap disposed on opposite sides of the first resonator; and wherein multiple openings are disposed in the sidewalls of the exhaust tube and configured to allow incoming sound waves to propagate from the exhaust tube into an interior of the first resonator. In another exemplary embodiment, one or more cylindrical guides are concentrically disposed around the exhaust tube and alternatingly coupled with the first endcap and the second endcap, such that the incoming sound waves travel along a path having a distance substantially equal to one quarter of a wavelength comprising the incoming sound waves. In another exemplary embodiment, the path comprises a distance that causes reflected sound waves returning to the multiple openings to destructively interfere with incoming sounds waves arriving at the multiple openings, thereby reducing acoustic energy exiting the first resonator.

In another exemplary embodiment, the second resonator is configured attenuate the exhaust sound waves by way of both destructive interference and Helmholtz resonance. In another exemplary embodiment, the second resonator is tuned to a total internal length that is substantially equal to one quarter of a wavelength of incoming sound waves. In another exemplary embodiment, the second resonator is configured to operate as a Helmholtz resonator to attenuate the one or more frequencies of exhaust sound waves. In another exemplary embodiment, the one or more frequencies of exhaust sound waves includes the at least one frequency of exhaust sound waves that is damped by the first resonator. In another exemplary embodiment, the one or more frequencies of exhaust sound waves includes a targeted Helmholtz frequency that is different than the at least one frequency of exhaust sound waves.

In another exemplary embodiment, the second resonator includes an exterior guide tube having a first length disposed between a first endcap and a second endcap; and wherein the resonant neck includes a first guide tube having a second length that extends from the first endcap into an interior of the exterior guide tube. In another exemplary embodiment, the first length and the second length are tuned with respect to one another so as to dampen the one or more frequencies of exhaust sound waves by way of destructive interference and Helmholtz resonance. In another exemplary embodiment, one or more cylindrical guides are concentrically disposed around the first guide tube and alternatingly coupled with the second endcap and the first endcap, such that incoming sound waves travel along a path having a distance substantially equal to one quarter of a wavelength comprising the incoming sound waves. In another exemplary embodiment, the path comprises a distance that causes reflected sound waves returning to the resonant neck to destructively interfere with incoming sounds waves arriving at the resonant neck, thereby reducing acoustic energy exiting the exhaust system.

These and other features of the concepts provided herein may be better understood with reference to the drawings, description, and appended claims.

BRIEF DESCRIPTION OF THE DRAWINGS

The drawings refer to embodiments of the present disclosure in which.

Figure 3:
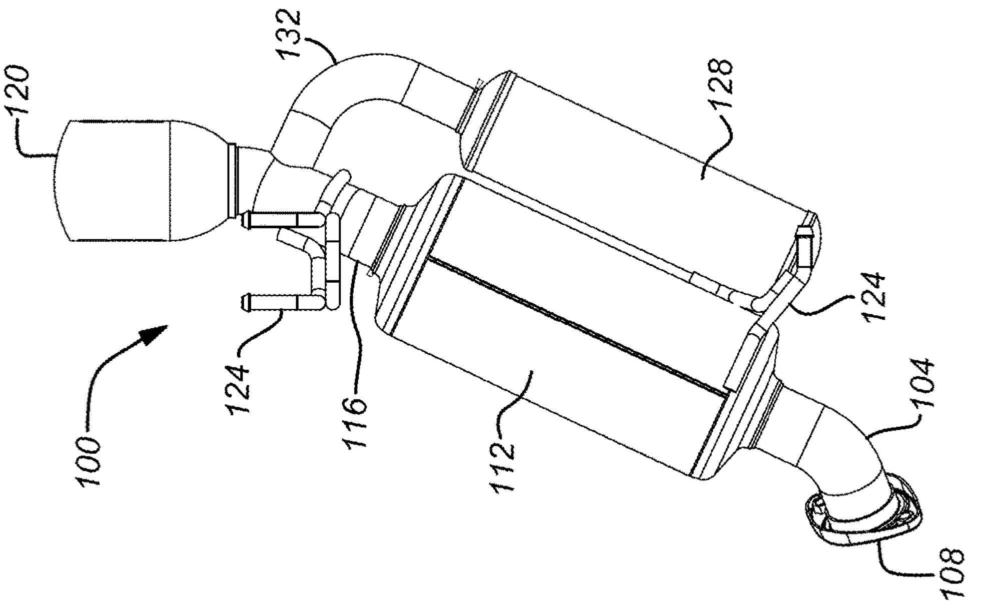
FIG. 3 illustrates a top plan view of the sound attenuating engine exhaust system of FIG. 1.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first endcap," may be made. However, the specific numeric reference should not be interpreted as a literal sequential order but rather interpreted that the "first endcap" is different than a "second endcap." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Exhaust drone is a deep, resonating sound that rattles the interior of a vehicle at certain engine speeds when the frequency of vibration of an exhaust system matches a natural frequency of vibration of the entire vehicle. Exhaust drone tends to be more prevalent with aftermarket, or performance exhaust systems, particularly those exhaust systems in which the components comprising the system have been welded together. Attempting to eliminate exhaust drone can be time consuming and difficult, and often requires a trial and error approach to resolve. Embodiments disclosed herein provide an apparatus and methods for a sound attenuating engine exhaust system capable of dampening, or attenuating, those certain acoustic frequencies within exhaust systems that give rise to undesirable exhaust noise.

Figure 2:
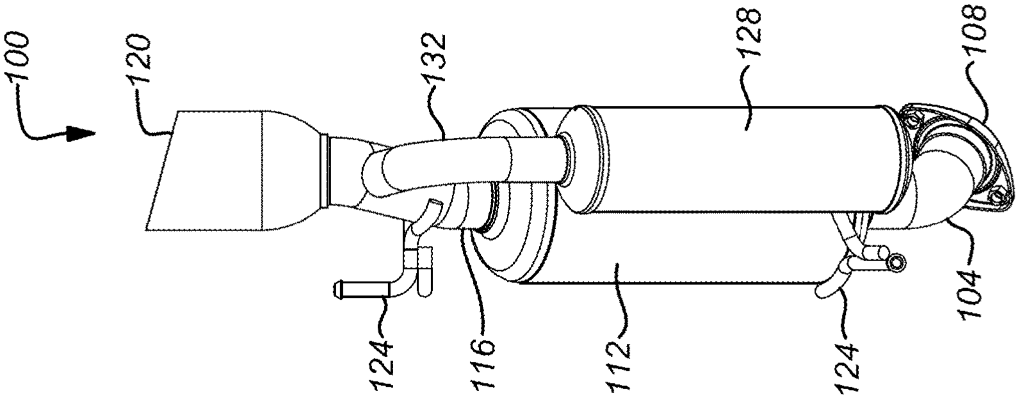
FIG. 2 illustrates a side plan view of the sound attenuating engine exhaust system of FIG. 1.
Figure 1:
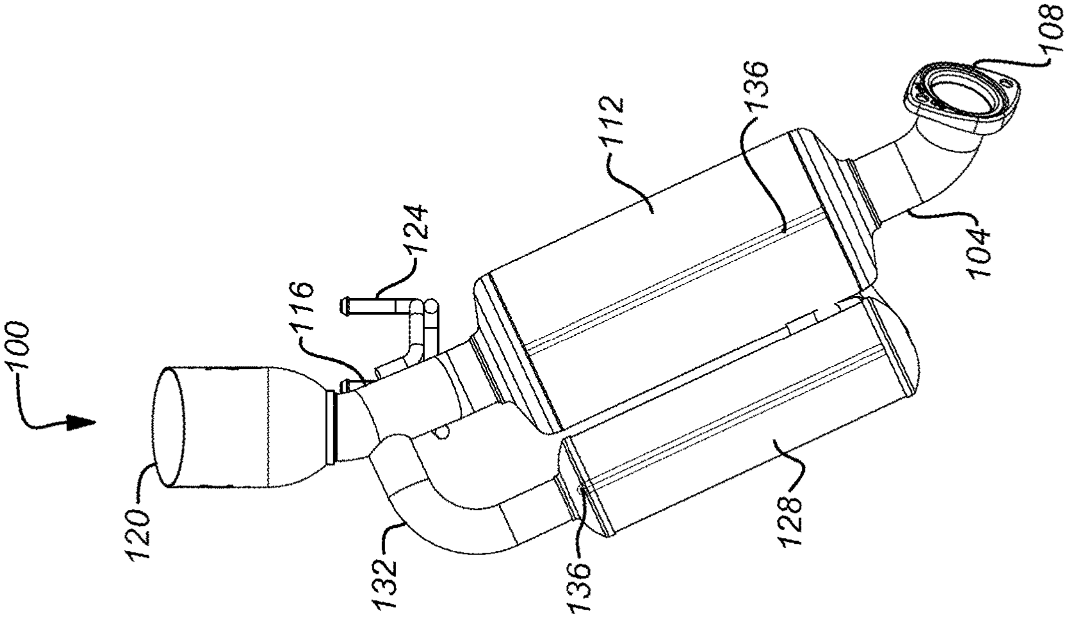
FIG. 1 illustrates a bottom plan view of an exemplary embodiment of a sound attenuating engine exhaust system in accordance with the present disclosure.

FIGS. 1 through 3 illustrate an exemplary embodiment of a sound attenuating engine exhaust system 100 configured to convey exhaust gases away from an internal combustion engine of a vehicle and attenuate exhaust drone at one or more frequencies of engine operation in accordance with the present disclosure. The exhaust system 100 generally comprises an exhaust inlet 104 that includes a flange 108 whereby exhaust gases of the internal combustion engine are directed into a first resonator 112. An exhaust outlet 116 directs the exhaust gases out of the first resonator 112 such that the gases exit the exhaust system 100 by way of an exhaust tip 120. Hangers 124 facilitate attaching the exhaust system 100 to an undercarriage of the vehicle such that the exhaust inlet 104 may be fastened to an exhaust pipe extending from the internal combustion engine. It is contemplated that the exhaust system 100 may be coupled with the exhaust system of the vehicle in lieu of an existing muffler. In some embodiments, however, the exhaust system 100 may be incorporated into the exhaust system of the vehicle in addition to the existing muffler, without limitation.

With continuing reference to FIGS. 1-3, the exhaust system 100 includes a second resonator 128 that is coupled with the first resonator 112 by way of a resonant neck 132. The resonant neck 132 is a generally tube-shaped member that is connected to the exhaust outlet 116 at a first end and connected to the second resonator 128 at a second end. The resonant neck 132 generally puts the second resonator 128 into fluid communication with the exhaust system 100, such that the second resonator 128 cooperates with the first resonator 112 to directly influence the acoustic properties of the exhaust system of the vehicle. Further, as shown in FIG. 1, each of the first and second resonators 112, 128 includes a drain hole 136 configured to allow condensed moisture to drain from the exhaust system 100.

During operating within an exhaust system of the vehicle, the first and second resonators 112, 128 cooperate to dampen, or attenuate, undesirable exhaust sounds, such as exhaust drone. As disclosed herein, the first resonator 112 is configured to utilize soundwave cancellation to attenuate targeted acoustic frequencies that give rise to undesirable exhaust sounds. More specifically, the first resonator 112 is tuned to reflect an incoming sound wave such that the sound wave destructively interferes with a following sound wave. In the embodiments disclosed herein, the first resonator 112 may be tuned to a length that causes the incoming sound wave to travel a distance that is substantially the same as one quarter of the wavelength to be attenuated before the wave is reflected toward the following sound wave. As such, the incoming sound wave travels a distance within the first resonator 112 that is substantially equivalent to one-half wavelength before interfering with the following sound wave. As will be appreciated, the reflected sound wave and the following sound wave destructively interfere, thereby reducing the acoustic energy that exits the first resonator 112.

The second resonator 128 operates similarly to the first resonator 112 in that the second resonator 128 may be tuned to a length of substantially one quarter of the wavelength to be attenuated. In addition, however, the second resonator 128 operates similarly to a Helmholtz resonator, which generally comprises a cavity connected to a system of interest through one or more short narrow tubes. As described in more detail hereinbelow, the second resonator 128 may be tuned in accordance with conventional Helmholtz resonance equations to attenuate sound waves having a targeted Helmholtz frequency. The targeted Helmholtz frequency may be the same as the frequency of the sound wave to be attenuated, due to the tuned length of the second resonator 128 described above, or the targeted Helmholtz frequency may be a second, distinct frequency in addition to the frequency of the sound wave to be attenuated. Accordingly, the second resonator 128 configured to be a hybrid resonator that attenuates acoustic waves by way of both destructive interference and Helmholtz resonance.

Figure 5B:
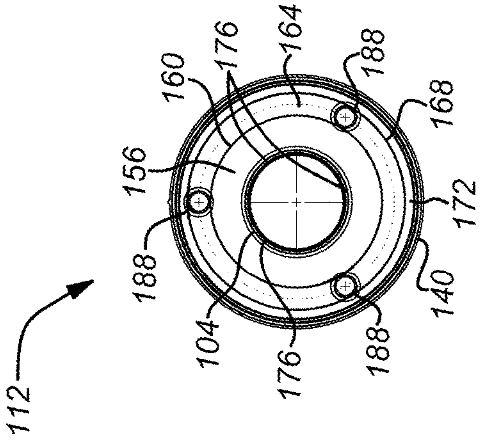
FIG. 5B illustrates cross-sectional side plan view of the first resonator of FIG. 5A, taken along a line 5B-5B.
Figure 5A:
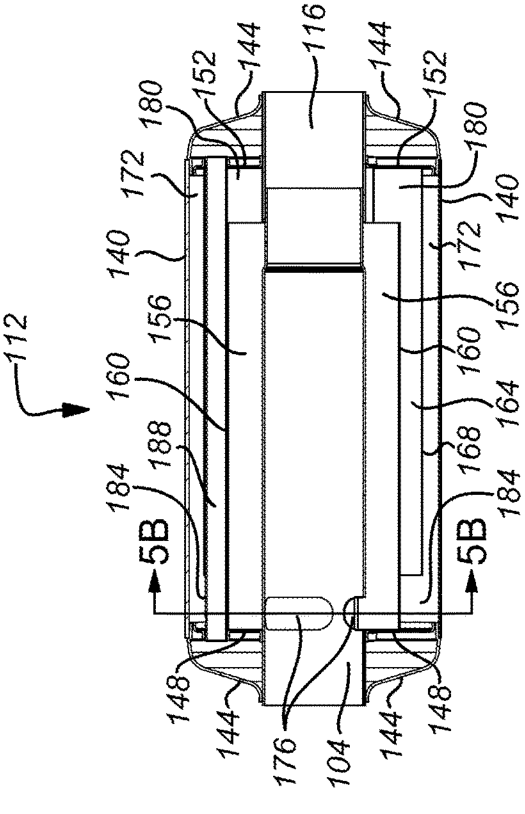
FIG. 5A illustrates cross-sectional side plan view of the first resonator of FIG. 5, taken along a line 5A-5A.
Figure 4:
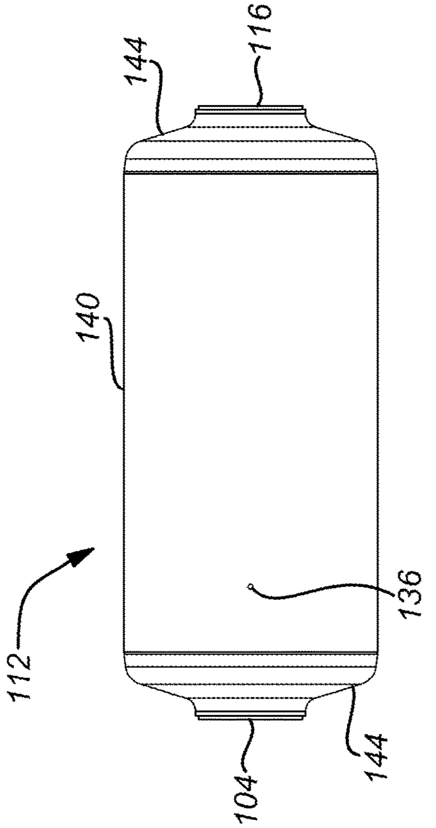
FIG. 4 illustrates a bottom plan view of an exemplary embodiment of a first resonator that may be incorporated into the sound attenuating engine exhaust system shown in FIGS. 1-3.
Figure 5:
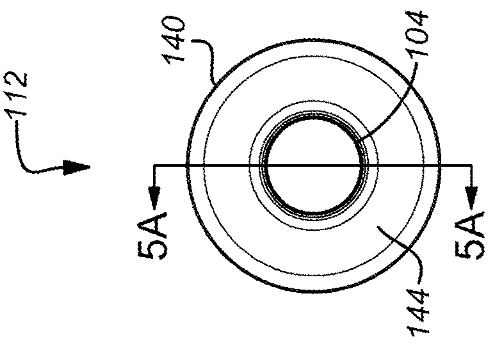
FIG. 5 illustrates a side plan view of an inlet side of the first resonator of FIG. 4.

FIGS. 4-5 illustrate an exemplary embodiment of a first resonator 112 that may be incorporated into the sound attenuating engine exhaust system 100 shown in FIGS. 1-3. The first resonator 112 includes the exhaust inlet 104 and the exhaust outlet 116 protruding from opposite ends of an exterior cylindrical wall 140. A muffler cap 144 joins each of the exhaust inlet 104 and the exhaust outlet 116 with the cylindrical wall 140. As shown in FIG. 5, the exhaust inlet 104 generally is coupled with the exhaust outlet 116 to form an exhaust tube that extends through the length of the first resonator 112.

FIGS. 5A and 5B illustrate cross-sectional side plan views of the first resonator 112 shown in FIG. 4. As shown in FIG. 5A, the first resonator 112 comprises multiple concentrically disposed cylindrical guides (i.e., “tubes”) that comprise sidewalls of cylindrical chambers that are bounded at opposite ends by a first endcap 148 and a second endcap 152. Upon comparing FIGS. 5A and 5B, it is straightforward to see that a first chamber 156 is disposed between the exhaust inlet 104 and a first cylindrical guide 160. A second chamber 164 is disposed between the first cylindrical guide 160 and a second cylindrical guide 168. Similarly, a third chamber 172 is disposed between the second cylindrical guide 168 and the exterior cylindrical wall 140.

With continuing reference to FIGS. 5A and 5B, multiple openings 176 are disposed in the sidewalls of the exhaust inlet 104. The openings 176 provide fluid communication between the exhaust inlet 104 and the first chamber 156, and thus the openings 176 serve to allow incoming sound waves to propagate from the exhaust inlet 104 into the first chamber 156. At an opposite end of the first chamber 156, an opening 180 is disposed between the first cylindrical guide 160 and the second endcap 152. The opening 180 places the first chamber 156 into fluid communication with the second chamber 164. Similarly, an opening 184 is disposed between the second cylindrical guide 168 and the first endcap 148, thereby establishing fluid communication between the second chamber 164 and the third chamber 172. As shown in FIG. 5A, the third chamber 172 terminates at the second endcap 152, between the second cylindrical guide 168 and the exterior cylindrical wall 140. Further, as shown in FIG. 5B, multiple supports 188 are disposed between the first and second cylindrical guides 160, 168. The supports 188 are configured to ensure that the first and second cylindrical guides 160, 168 remain concentrically disposed within the first resonator 112.

Figure 6:
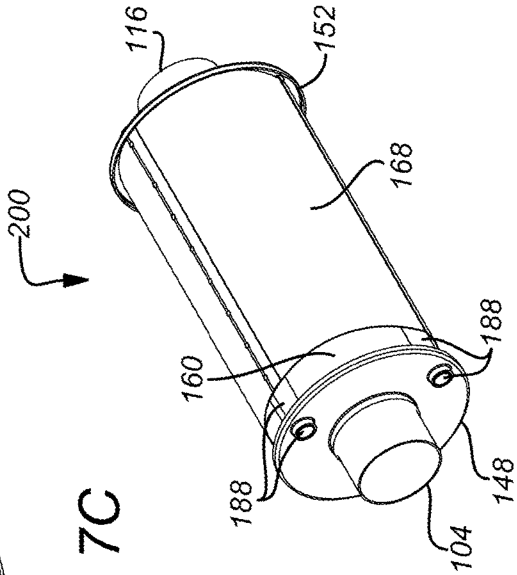
FIG. 6 illustrates an isometric view of a subassembly that may be incorporated into the first resonator of FIG. 4.
Figure 7C:
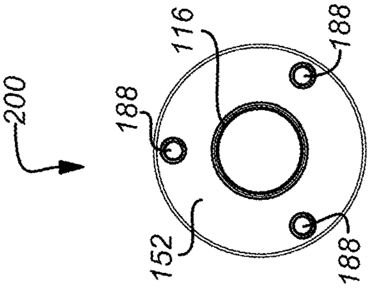
FIG. 7C illustrates a side plan view of an outlet side of the subassembly of FIG. 6.
Figure 7A:
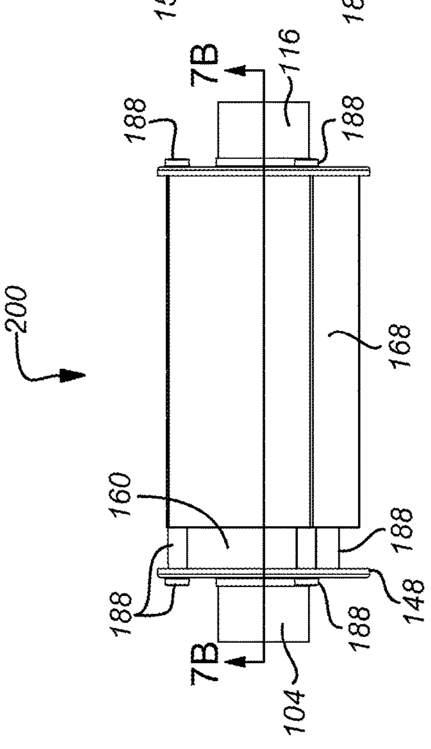
FIG. 7A illustrates a side plan view of the subassembly of FIG. 6.
Figure 7B:
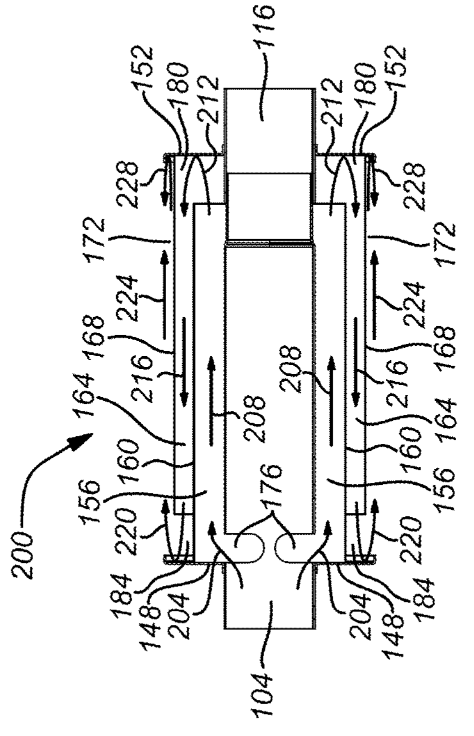
FIG. 7B illustrates a cross-sectional side plan view of the subassembly of FIG. 7A, taken along a line 7B-7B.

FIG. 6 and FIGS. 7A though 7B illustrate the first resonator 112 of FIGS. 4 and 5A-5B in absence of the exterior cylindrical wall 140 and the muffler caps 144. Accordingly, FIGS. 6 and 7A-7B illustrate an exemplary embodiment of a subassembly 200 that may be incorporated into the first resonator 112. As best shown in FIGS. 6, 7A and 7C, the supports 188 extend through the first and second endcaps 148, 152 at opposite ends of the first resonator 112. It is contemplated that the supports 188 may be fastened to the first and second endcaps 148. 152 by any suitable means, such as, by way of non-limiting example, welding, brazing, crimping, and any of various hardware fasteners, without limitation. Similarly, the first and second endcaps 148, 152 may be respectively fastened to the exhaust inlet 104 and the exhaust outlet 116 by way of any of welding, brazing, crimping, any of various hardware fasteners, and the like.

In the embodiment illustrated in FIG. 7C, three of the supports 188 are disposed uniformly around the circumference of the first resonator 112. It is contemplated, however, that in other embodiments, more than or less than three supports 188 may be disposed between the first and second cylindrical guides 160, 168, without limitation. For example, in one embodiment, two supports 188 may be disposed at opposite sides of the circumference of the first resonator 112. Moreover, the supports 188 need not be uniformly positioned, or separated by equal angles, around the circumference of the first resonator 112. Rather, in some embodiments, the supports 188 may be separated by way of any of various unequal angles as is deemed appropriate.

FIG. 7B illustrates a cross-sectional view of the subassembly 200 of FIG. 7A, taken along a line 7B-7B. The subassembly 200 of FIG. 7B comprises the multiple concentrically disposed cylindrical guides discussed with respect to FIG. 5A. Accordingly, the first chamber 156 is disposed between the exhaust inlet 104 and the first cylindrical guide 160. Fluid communication is established between the first chamber 156 and the second chamber 164 by way of an opening 180. The second chamber 164 is disposed between the first cylindrical guide 160 and the second cylindrical guide 168. An opening 184 establishes fluid communication between the second chamber 164 and the third chamber 172. In the embodiment illustrated in FIG. 7B, the third chamber 172 is disposed outside of the second cylindrical guide 168. Once the exterior cylindrical wall 140 is installed onto the subassembly 200, as shown in FIG. 5A, the third chamber 172 is disposed between the second cylindrical guide 168 and the exterior cylindrical wall 140.

As described hereinabove in connection with FIG. 5A, multiple openings 176 disposed in the sidewalls of the exhaust inlet 104 serve to allow incoming sound waves to propagate from the exhaust inlet 104 into the first chamber 156. As shown in FIG. 7B, an incoming sound wave follows a path 204 through the openings 176 into the first chamber 156. The sound wave propagates along a lengthwise path 208 through the first chamber 156 until colliding with the second endcap 152. The second endcap 152 reflects the sound wave along a path 212 through the opening 180 and into the second chamber 164. As shown in FIG. 7B, the sound wave travels along a lengthwise path 216 through the second chamber 164 until encountering the first endcap 148. The first endcap 148 reflects the sound wave along a path 220 through the opening 184 and into the third chamber 172. Although not shown in FIG. 7B, with the exterior cylindrical wall 140 installed onto the subassembly 200, the sound wave is directed along a lengthwise path 224 through the third chamber 172 until colliding with the second endcap 152.

Once the incoming sound wave arrives at the second endcap 152, the sound wave is reflected along a path 228 shown in FIG. 7B. The reflected sound wave is then directed back toward the first endcap 148 and then reflected through the chambers 172, 164, 152 until reaching the openings 176 in the sidewall of the exhaust inlet 104. Upon arriving at the openings 176, the reflected sound wave encounters an incident sound wave entering through the openings 176. As mentioned hereinabove, in the embodiment illustrated in FIGS. 7B, the length of the chambers 152, 164, 172 are tuned to a length that causes the sound wave to be attenuated to travel a distance substantially the same as one quarter of the wavelength of the sound wave. As such, upon arriving at the openings 176, the reflected sound wave has traveled a distance within the first resonator 112 that is substantially equivalent to one-half wavelength of the incident sound wave encountered at the openings 176. As will be appreciated, therefore, the reflected sound wave and the incident sound wave destructively interfere with one another, thereby reducing the acoustic energy that exits the first resonator 112.

Figure 9A:
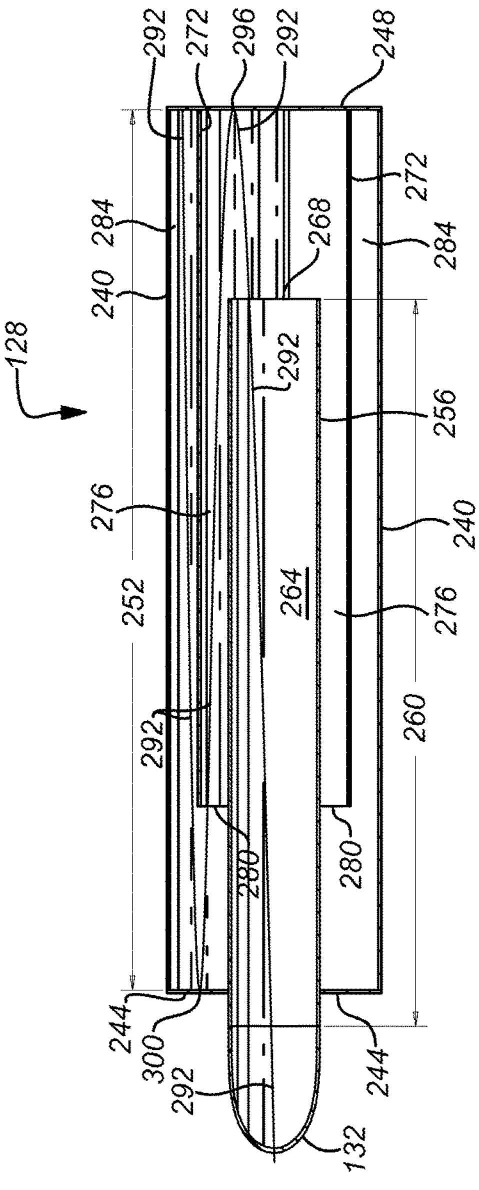
FIG. 9A illustrates a cross-sectional side view of the second resonator of FIG. 8, taken along a line 9A-9A.
Figure 9B:
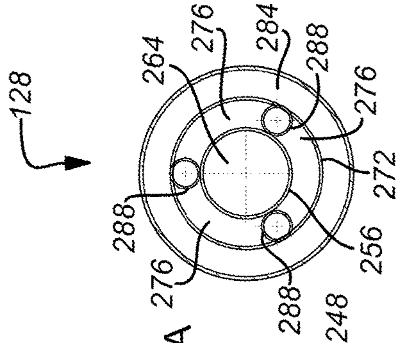
FIG. 9B illustrates a cross-sectional side view of the second resonator of FIG. 8, taken along a line 9B-9B.
Figure 8:
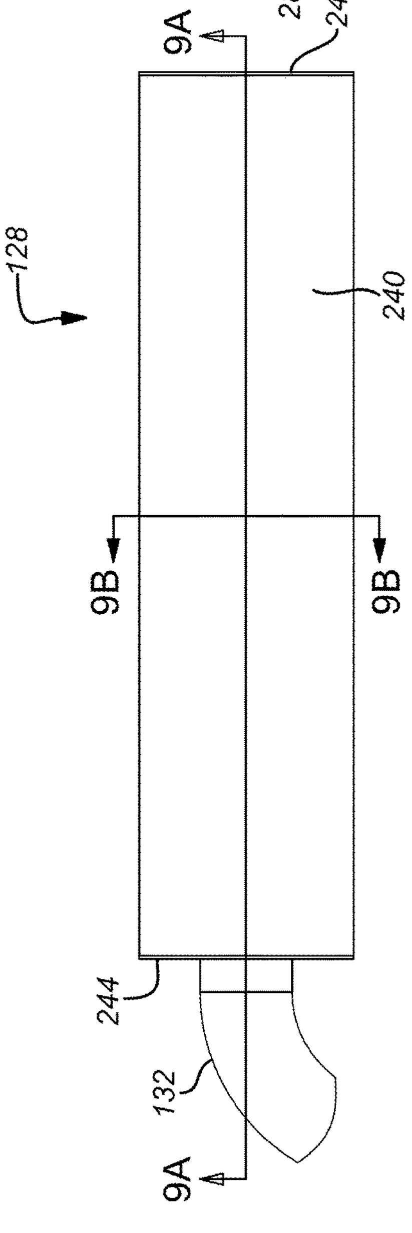
FIG. 8 illustrates a side plan view of an exemplary embodiment of a second resonator that may be incorporated into the sound attenuating engine exhaust system shown in FIGS. 1-3.

Turning now to FIGS. 8 and 9A through 9B, an exemplary embodiment of a second resonator 128 that may be incorporated into the sound attenuating engine exhaust system 100 is shown. As described hereinabove, the second resonator 128 is configured to be a hybrid resonator that attenuates acoustic waves by way of both destructive interference and Helmholtz resonance. The second resonator 128 generally comprises a cylindrical member having an exterior guide tube 240 disposed between a first endcap 244 and a second endcap 248. As best shown in FIG. 9A, the exterior guide tube 240 includes an overall length 252, and the resonant neck 132 includes a first guide tube 256 having a length 260 that extends into the interior of the exterior guide tube 240. The lengths 252, 260 are tuned with respect to one another so as to give rise to destructive interference of sound waves and Helmholtz resonance, as described herein.

As shown in FIG. 9A, the first guide tube 256 defines a first chamber 264 having an open end 268 near the second endcap 248. The first guide tube 256 is concentrically disposed within a second guide tube 272 that is mounted onto an interior of the second endcap 248. The volume between the first guide tube 256 and the second guide tube 272 comprises a second chamber 276 having an open end 280 near the first endcap 244. The volume between the second guide tube 272 and the exterior guide tube 240 defines a third chamber 284 that extends from the open end 280 to the second endcap 248.

As best shown in FIG. 9B, multiple supports 288 are disposed between the first and second guide tubes 256, 272. The supports 288 extends from the first endcap 244 to the second endcap 248 and are configured to ensure that the first and second guide tubes 256, 272 remain concentrically disposed within the second resonator 128. It is contemplated that the supports 288 may be fastened to the first and second endcaps 244. 248 by any suitable means, such as, by way of non-limiting example, welding, brazing, crimping, and any of various hardware fasteners, without limitation. Although in the embodiment illustrated in FIG. 9B, three supports 288 are shown disposed uniformly around the circumference of the second resonator 128, it should be understood that, in other embodiments, more than or less than three supports 288 may be disposed between the first and second guide tubes 256, 272, without limitation. Further, the supports 288 need not be uniformly positioned, or separated by equal angles, around the circumference of the second resonator 128, but rather, in some embodiments the supports 288 may be separated by way of any of various unequal angles as is deemed appropriate and without limitation.

Turning again to FIG. 9A, a path 292 is shown extending from within the resonant neck 132, through the chambers 264, 276, 284 until encountering the second endcap 248. The path 292 represents the distance traveled by an incoming sound wave as it propagates through the chambers 264, 276, 284 of the second resonator 128. Accordingly, the incoming sound wave follows the path 292 through the first chamber 264 until encountering the second endcap 148. The second endcap 248 reflects the incoming sound wave, indicated by a point of reflection 296, directing the incoming sound wave along the path 292 into the second chamber 276. The incoming sound wave propagates along the path 292 through the second chamber 276 until encountering a point of reflection 300 at the first endcap 244 whereby the incoming sound wave is directed into the third chamber 284. The incoming sound wave then travels along the path 292 through the third chamber 284 until colliding with the second endcap 248.

Once the incoming sound wave arrives at the second endcap 248, the sound wave is reflected back along the path 292 shown in FIG. 9A. Thus, the reflected sound wave is directed back through the third chamber 284 toward the first endcap 148 and then reflected at the point of reflection 300 through the second chamber 276. Upon arriving at the point of reflection 296 of the second endcap 248, the reflected sound wave is directed along the path 292 through the first chamber 264 toward the beginning of the resonant neck 132 near the first endcap 244. As the reflected sound wave arrives at the beginning of the resonant neck 132, a following incident sound wave is encountered entering the resonant neck 132.

As mentioned hereinabove, the length 252 of the chambers 276, 284 and the length 260 of the first chamber 264 are tuned such that the path 292 is substantially equal to one-quarter wavelength of the sound wave. As such, after traveling along the path 292 into the second resonator 128 and following the path 292 back to the beginning of the resonant neck 132, the reflected sound wave has traveled a distance within the second resonator 128 that is substantially equivalent to one-half wavelength of the incident sound wave encountered at the beginning of the resonant neck 132. Consequently, the reflected sound wave and the incident sound wave destructively interfere with one another, thereby reducing the acoustic energy that exits the second resonator 128.

As disclosed herein, the second resonator 128 is configured to be a hybrid resonator that attenuates acoustic waves by way of both destructive interference and Helmholtz resonance. Those skilled in the art will recognize that the second resonator 128 and the resonant neck 132 resemble a classical Helmholtz resonator, generally comprising a cavity coupled with a neck that branches off a system wherein noise reduction is desired, such as the exhaust outlet 116 (see FIG. 1). Optimal sound attenuation may be achieved when the excitation frequency of the sound to be attenuated is substantially equal to the natural frequency of the Helmholtz resonator. With a foreknowledge of the excitation frequency, the natural frequency may be tailored to match by appropriately configuring the geometry of the cavity and the neck in accordance with conventional Helmholtz resonance equations.

In the embodiment illustrated in FIG. 9A, a target Helmholtz natural frequency may be obtained by configuring a volume, $V_1$, of the resonant neck 132 (the first chamber 256), and a combined volume, $V_2$, of the second and third chambers 276, 284. The volume, $V_1$, of the first chamber 256 is proportional to the length 260 by which the resonant neck 132 extends into the second resonator 128. The combined volume, $V_2$, of the second and third chambers 276, 284 is proportional to the length 252 of the second resonator 128. However, those skilled in the art will recognize that the volumes $V_1$ and $V_2$ are inversely proportional to one another, and thus increasing one alone decreases the other. It is contemplated that the volumes $V_1$ and $V_2$ may be tuned to target a desired Helmholtz natural frequency by suitably adjusting the lengths 252, 260 of the second resonator 128. It is further contemplated that the targeted Helmholtz natural frequency may be the same as the frequency of the sound wave to be attenuated by way of destructive interference, as described above with reference to FIG. 9A, or the targeted Helmholtz natural frequency may be a second, distinct frequency in addition to the frequency of the sound waves to be destructively interfered.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A sound attenuating engine exhaust system to convey exhaust gases away from an internal combustion engine of a vehicle, the exhaust system comprising:

an exhaust inlet configured to receive exhaust gases from the internal combustion engine;

a first resonator coupled with the exhaust inlet and configured to dampen at least one frequency of exhaust sound waves, the first resonator comprising a drain hole configured to allow moisture from the exhaust system;

an exhaust outlet for directing the exhaust gases out of the first resonator;

a second resonator configured to cooperate with the first resonator to dampen one or more frequencies of exhaust sound waves;

a resonant neck connecting the second resonator with the exhaust outlet and configured to cooperate with the second resonator to dampen the one or more frequencies of exhaust sound waves, wherein the resonant neck is disposed between an exhaust tip and the first resonator wherein the second resonator includes an exterior guide tube having a first length disposed between a first endcap and a second endcap; and wherein the resonant neck includes a first guide tube having a second length that extends from the first endcap into an interior of the exterior guide tube wherein the first length and the second length are tuned with respect to one another so as to dampen the one or more frequencies of exhaust sound waves by way of destructive interference and Helmholtz resonance; and wherein an incident sound wave is encountered entering the resonant neck when a reflected sound wave arrives at the beginning of the resonant neck.

2. The exhaust system of claim 1, wherein the resonant neck comprises a tube-shaped member that is connected to the exhaust outlet at a first end and connected to the second resonator at a second end.

3. The exhaust system of claim 1, wherein the resonant neck puts the second resonator into fluid communication with the exhaust system, such that the second resonator cooperates with the first resonator to directly influence the acoustic properties of the exhaust system of the vehicle.

4. The exhaust system of claim 1, wherein the first resonator is configured to attenuate the at least one frequency of exhaust sound waves by way of destructive interference.

5. The exhaust system of claim 4, wherein the first resonator is tuned to reflect an incoming sound wave so as to destructively interfere with a following sound wave.

6. The exhaust system of claim 5, wherein the first resonator is tuned to a length that causes the incoming sound wave to travel a distance that is substantially the same as one quarter of a wavelength of the incoming sound wave before being reflected.

7. The exhaust system of claim 6, wherein the incoming sound wave travels a distance within the first resonator that is substantially equivalent to one half of the wavelength before destructively interfering with the following sound wave, thereby reducing acoustic energy exiting the first resonator.

8. The exhaust system of claim 1, wherein the exhaust inlet is coupled with the exhaust outlet to form an exhaust tube that extends from a first endcap to a second endcap disposed on opposite sides of the first resonator; and wherein multiple openings are disposed in the sidewalls of the exhaust tube and configured to allow incoming sound waves to propagate from the exhaust tube into an interior of the first resonator.

9. The exhaust system of claim 8, wherein one or more cylindrical guides are concentrically disposed around the exhaust tube and alternatingly coupled with the first endcap and the second endcap, such that the incoming sound waves travel along a path having a distance substantially equal to one quarter of a wavelength comprising the incoming sound waves.

10. The exhaust system of claim 9, wherein the path comprises a distance that causes reflected sound waves returning to the multiple openings to destructively interfere with incoming sounds waves arriving at the multiple openings, thereby reducing acoustic energy exiting the first resonator.

11. The exhaust system of claim 1, wherein the second resonator is configured attenuate the exhaust sound waves by way of both destructive interference and Helmholtz resonance.

12. The exhaust system of claim 1, wherein the second resonator is tuned to a total internal length that is substantially equal to one quarter of a wavelength of incoming sound waves.

13. The exhaust system of claim 1, wherein the second resonator is configured to operate as a Helmholtz resonator to attenuate the one or more frequencies of exhaust sound waves.

14. The exhaust system of claim 13, wherein the one or more frequencies of exhaust sound waves includes the at least one frequency of exhaust sound waves that is damped by the first resonator.

15. The exhaust system of claim 14, wherein the one or more frequencies of exhaust sound waves includes a targeted Helmholtz frequency that is different than the at least one frequency of exhaust sound waves.

16. The exhaust system of claim 1, wherein one or more cylindrical guides are concentrically disposed around the first guide tube and alternatingly coupled with the second endcap and the first endcap, such that incoming sound waves travel along a path having a distance substantially equal to one quarter of a wavelength comprising the incoming sound waves.

17. The exhaust system of claim 1, wherein the path comprises a distance that causes reflected sound waves returning to the resonant neck to destructively interfere with incoming sounds waves arriving at the resonant neck, thereby reducing acoustic energy exiting the exhaust system.

* * * * *